US 9,334,759 B2

(12) United States Patent
Roy et al.

(10) Patent No.: US 9,334,759 B2
(45) Date of Patent: May 10, 2016

(54) GRID VALVE ASSEMBLY

(71) Applicants: Kevin John Lewis Roy, Clifton Park, NY (US); Patrick Michael Wing, Averill Park, NY (US); Jeffrey Robert Simkins, Rensselaer, NY (US); Luke P. Zimmer, Pomfret, CT (US); Frederick A. Woehr, Worcester, PA (US)

(72) Inventors: Kevin John Lewis Roy, Clifton Park, NY (US); Patrick Michael Wing, Averill Park, NY (US); Jeffrey Robert Simkins, Rensselaer, NY (US); Luke P. Zimmer, Pomfret, CT (US); Frederick A. Woehr, Worcester, PA (US)

(73) Assignee: Dresser-Road Company, Olean, NY (US)

( * ) Notice: Subject to any disclaimer, the term of this patent is extended or adjusted under 35 U.S.C. 154(b) by 24 days.

(21) Appl. No.: 14/564,222

(22) Filed: Dec. 9, 2014

(65) Prior Publication Data

US 2015/0226089 A1    Aug. 13, 2015

Related U.S. Application Data

(60) Provisional application No. 61/937,185, filed on Feb. 7, 2014.

(51) Int. Cl.
| | |
|---|---|
| F01D 17/14 | (2006.01) |
| F01K 7/04 | (2006.01) |
| F01K 7/02 | (2006.01) |
| F16K 47/08 | (2006.01) |
| F16K 47/04 | (2006.01) |
| F16K 3/26 | (2006.01) |
| F16K 5/04 | (2006.01) |

(52) U.S. Cl.
CPC ............... *F01K 7/04* (2013.01); *F01D 17/145* (2013.01); *F01D 17/148* (2013.01); *F01K 7/025* (2013.01); *F16K 3/26* (2013.01); *F16K 5/0421* (2013.01); *F16K 47/045* (2013.01); *F16K 47/08* (2013.01); *F05D 2220/31* (2013.01); *F05D 2270/58* (2013.01)

(58) Field of Classification Search
CPC ....... F16K 5/0421; F16K 47/045; F16K 3/26; F16K 47/08; F01D 17/145; F01D 17/148; F01K 7/04; F01K 7/025; F05D 2270/58; F05D 2220/31
USPC ........................................................ 415/159
See application file for complete search history.

(56) References Cited

U.S. PATENT DOCUMENTS 5,409,351 A * 4/1995 Geist .................... F01D 17/148
                                                        137/625.31

* cited by examiner

*Primary Examiner* — Igor Kershteyn
*Assistant Examiner* — Aaron R Eastman
(74) *Attorney, Agent, or Firm* — Edmonds & Nolte, PC

(57) ABSTRACT

A grid valve assembly for a steam turbine is provided. The grid valve assembly may include an annular stationary member disposed between an upstream stage and a downstream stage of the steam turbine. The annular stationary member may define a plurality of stationary member openings extending radially therethrough from an outer circumferential surface to an inner circumferential surface thereof. The grid valve assembly may also include an annular rotatable member rotatably disposed about the outer circumferential surface of the annular stationary member. The annular rotatable member may define a plurality of rotatable member openings extending radially therethrough.

20 Claims, 9 Drawing Sheets

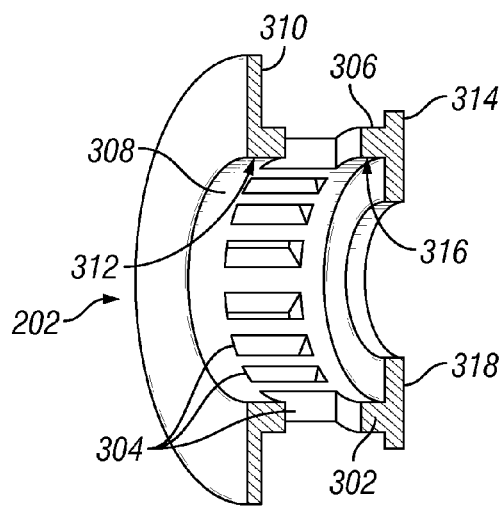 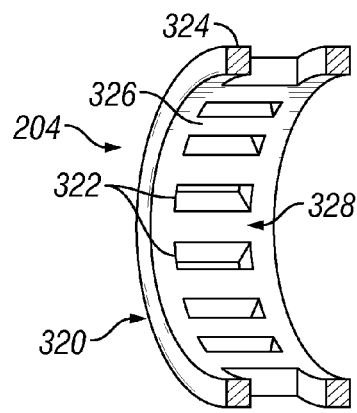
*FIG. 3A*  *FIG. 3B*
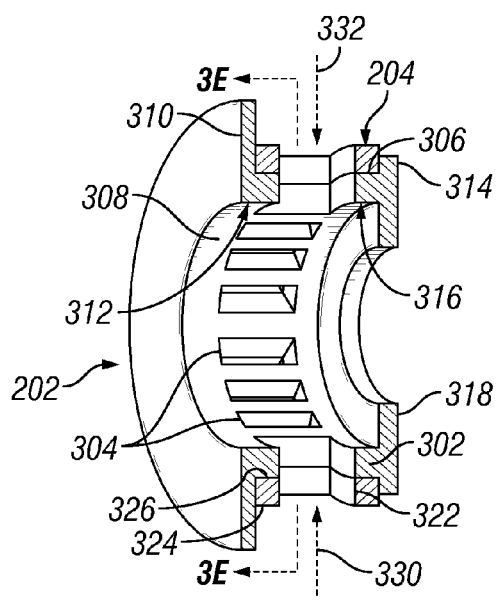 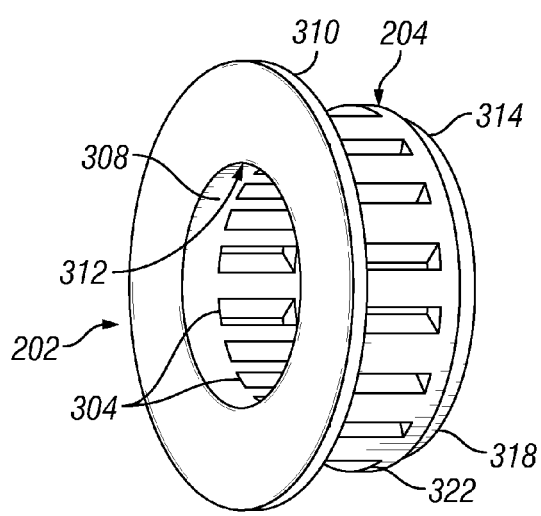
*FIG. 3C*  *FIG. 3D*

GRID VALVE ASSEMBLY

CROSS REFERENCE TO RELATED APPLICATIONS

This application claims the benefit of U.S. Provisional Patent Application having Ser. No. 61/937,185, which was filed Feb. 7, 2014. The aforementioned patent application is hereby incorporated by reference in its entirety into the present application to the extent consistent with the present application.

BACKGROUND

In a myriad of industrial applications and processes, conventional multi-stage steam turbines may often be utilized to maintain a working fluid (i.e., steam) at varying predetermined pressures over a broad range. Energy of the pressurized steam may be extracted from the multi-stage steam turbines and converted to work to operate one or more downstream processes. A conventional multi-stage steam turbine 100 is illustrated in FIG. 1 and may include a casing 102 having a rotary shaft 104 supported therein by one or more suitable bearings (one is shown 106). In operation, the steam may be introduced into the casing 102 via an inlet control valve 108 and subsequently directed to successive zones or stages (two are shown 110, 112) of the multi-stage steam turbine 100. A first or upstream stage 110 may be configured to contain the steam at a relatively higher pressure than a second or downstream stage 112, which may be configured to contain the steam at a relatively lower pressure. The multi-stage steam turbine 100 may include a grid valve assembly 114 disposed about the rotary shaft 104 between the upstream stage 110 and the downstream stage 112. The grid valve assembly 114 may be configured to control a flow of the steam from the upstream stage 110 to the downstream stage 112. Accordingly, the grid valve assembly 114 may also be configured to control and/or maintain a pressure differential of the steam between the upstream and downstream stages 110, 112.

As illustrated in FIG. 1, the conventional grid valve assembly 114 may include a stationary plate 116 and a rotatable plate 118 disposed on or adjacent the stationary plate 116 and configured to rotate relative to the stationary plate 116. The stationary plate 116 and the rotatable plate 118 of the grid valve assembly 114 may each define a plurality of openings 120, 122 extending axially therethrough. In operation, the grid valve assembly 114 may be actuated to an "opened" position to thereby provide fluid communication between the upstream and downstream stages 110, 112. The grid valve assembly 114 may be actuated to the "opened" position by actuating or rotating the rotatable plate 118 such that the plurality of openings 122 thereof align or overlap with the plurality of openings 120 of the stationary plate 116. The grid valve assembly 114 may also be actuated to a "closed" position to thereby prevent fluid communication between the upstream and downstream stages 110, 112. The grid valve assembly 114 may be actuated to the "closed" position by rotating the rotatable plate 118 such that the plurality of openings 122 thereof do not overlap with the plurality of openings 120 of the stationary plate 116. In the "closed" position, at least a portion of the steam may be extracted from the upstream stage 110 to a downstream process via an extraction conduit 124.

As previously discussed, the grid valve assembly 114 may be configured to control and/or maintain the pressure differential of the steam between the upstream and downstream stages 110, 112 of the multi-stage steam turbine 100. The pressure differential of the steam, however, may increase resistance to or prevent the actuation of the grid valve assembly 114 between the "opened" and "closed" positions. For example, the pressure differential between the upstream and downstream stages 110, 112 may result in a net biasing force being applied axially to the rotatable plate 118, which may urge the rotatable plate 118 toward the stationary plate 116 and cause the respective annular surfaces 126, 128 thereof to engage one another. The engagement of the respective annular surfaces 126, 128 may result in the formation and/or increase of frictional forces between the rotatable plate 118 and the stationary plate 116, which may resist or prevent the rotation of the rotatable plate 118.

In multi-stage steam turbines 100 having a relatively low pressure differential (e.g., about 690 kPa or less), conventional actuators may be utilized to provide an actuating force capable of rotating the rotatable plate 118 despite the frictional forces. In multi-stage steam turbines 100 having a relatively high pressure differential (e.g., about 690 kPa or greater), however, the conventional actuators may not be capable of overcoming the frictional forces. For example, as the pressure differential between the upstream and downstream stages 110, 112 increases, the net biasing force and the resulting frictional forces may correspondingly increase, and the conventional actuators may not be capable of overcoming the increased frictional forces. Accordingly, the high pressure differential of the multi-stage steam turbine 100 may impose a limitation on the utility of the conventional grid valve assembly 114. While an increased actuating force may be employed to overcome the limitations of the grid valve assembly 114, utilizing actuators capable of providing the increased actuating force may not be a commercially and/or economically viable option.

What is needed, then, is a grid valve assembly that may be actuated in multi-stage steam turbines having a relatively high pressure differential between successive stages thereof.

SUMMARY

Embodiments of the disclosure may provide a grid valve assembly for a steam turbine. The grid valve assembly may include an annular stationary member disposed between an upstream stage and a downstream stage of the steam turbine. The annular stationary member may define a plurality of stationary member openings extending radially therethrough from an outer circumferential surface to an inner circumferential surface thereof. The grid valve assembly may also include an annular rotatable member rotatably disposed about the outer circumferential surface of the annular stationary member. The annular rotatable member may define a plurality of rotatable member openings extending radially therethrough.

Embodiments of the disclosure may also provide a steam turbine. The steam turbine may include a casing at least partially defining a first stage and a second stage of the steam turbine downstream from the first stage, a rotary shaft supported in the casing, and a first grid valve assembly configured to control a flow of steam from the first stage to the second stage. The first grid valve assembly may include a first stationary member disposed about the rotary shaft and coupled with the casing between the first stage and the second stage, and a first rotatable member disposed about the first stationary member and defining a plurality of first rotatable member openings extending radially therethrough. The first stationary member may define a plurality of first stationary member openings extending radially through at least a portion of the first stationary member. The first rotatable member may be configured to rotate about the first stationary member to selectively provide fluid communication between the first stage and the second stage.

Embodiments of the disclosure may also provide another grid valve assembly for a steam turbine. The grid valve assembly may include a stationary member having an annular body disposed between an upstream stage and a downstream stage of the steam turbine. The stationary member may define stationary member openings extending radially through a portion of the annular body from an outer circumferential surface toward an inner circumferential surface thereof. A first axial end portion of the stationary member may define a plurality of axial bores fluidly coupled with the stationary member openings. The grid valve assembly may also include an annular rotatable member disposed about the outer circumferential surface of the annular body and defining rotatable member openings extending radially therethrough. The annular rotatable member may be configured to rotate about the annular body of the stationary member to selectively provide fluid communication between the upstream stage and the downstream stage of the steam turbine.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 3A illustrates a cross-sectional, perspective view of the stationary member of the grid valve assembly of FIG. 2, according to one or more embodiments disclosed.

FIG. 3B illustrates a cross-sectional, perspective view of the rotatable member of the grid valve assembly of FIG. 2, according to one or more embodiments disclosed.

FIG. 3C illustrates a cross-sectional, perspective view of the grid valve assembly of FIG. 2, according to one or more embodiments disclosed.

FIG. 3D illustrates a perspective view of the grid valve assembly of FIG. 2, according to one or more embodiments disclosed.

DETAILED DESCRIPTION

Figure 1:
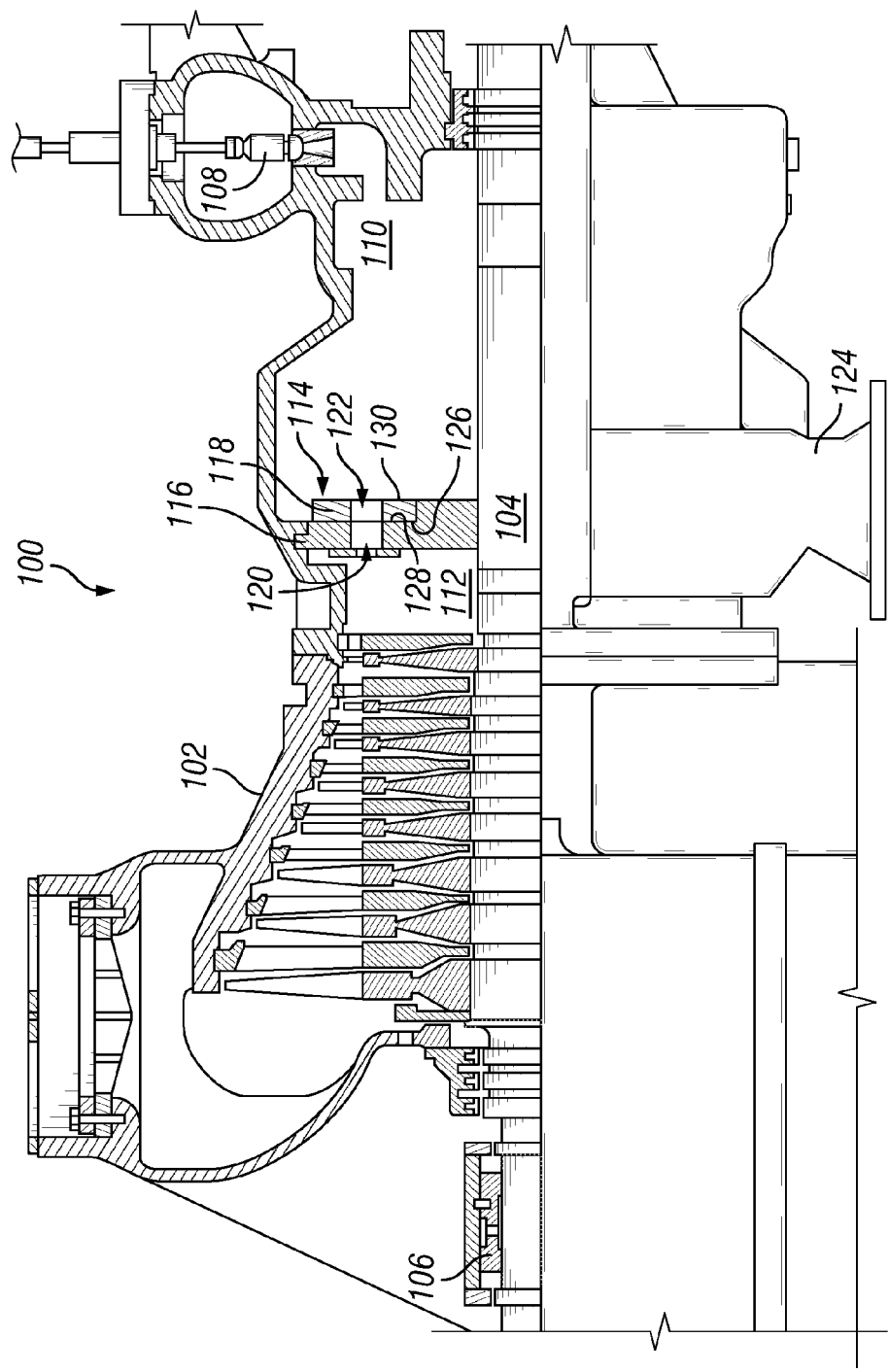
FIG. 1 illustrates a partial, cross-sectional view of a conventional multi-stage steam turbine including a conventional grid valve, according to the prior art.

It is to be understood that the following disclosure describes several exemplary embodiments for implementing different features, structures, or functions of the present disclosure. Exemplary embodiments of components, arrangements, and configurations are described below to simplify the present disclosure; however, these exemplary embodiments are provided merely as examples and are not intended to limit the scope of the present disclosure. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure Additionally, certain terms are used throughout the following description and the claims to refer to particular components. As one skilled in the art will appreciate, various entities may refer to the same component by different names, and as such, the naming convention for the elements described herein is not intended to limit the scope of the present disclosure, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
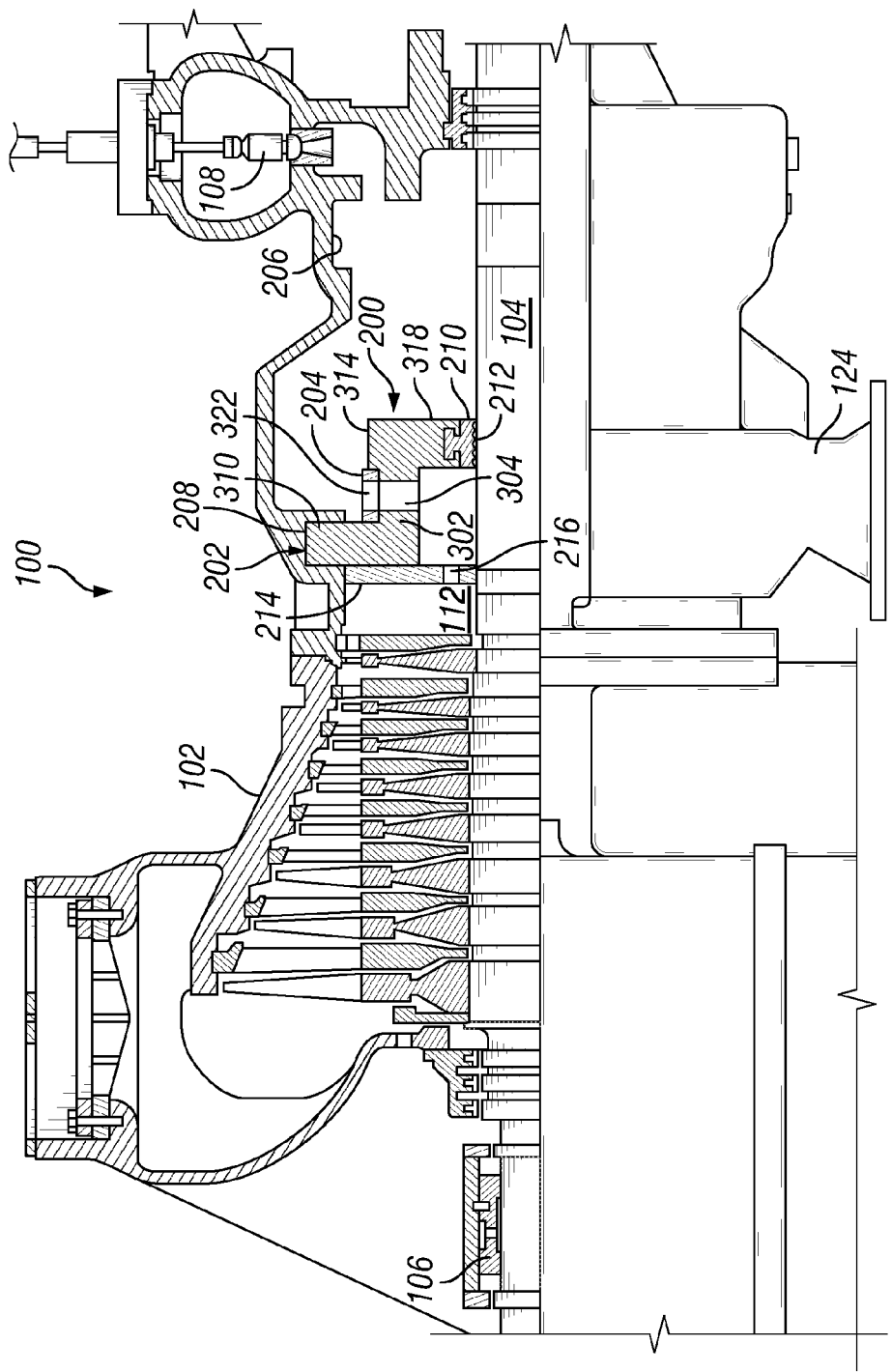
FIG. 2 illustrates a partial, cross-sectional view of the conventional multi-stage steam turbine of FIG. 1 including an exemplary grid valve assembly having a stationary member and a rotatable member, according to one or more embodiments disclosed.

FIG. 2 illustrates a cross-sectional view of an exemplary grid valve assembly 200 disposed in the multi-stage steam turbine 100 of FIG. 1, according to one or more embodiments. The grid valve assembly 200 may be substituted for or be utilized in place of the conventional grid valve assembly 114 in the multi-stage steam turbine 100 discussed above with reference to FIG. 1. As further described herein, the grid valve assembly 200 may include a stationary member 202 and a rotatable member 204 disposed adjacent the stationary member 202 and configured to rotate relative to the stationary member 202.

As illustrated in FIG. 2, the stationary member 202 may be disposed about the rotary shaft 104 between the upstream stage 110 and the downstream stage 112 of the multi-stage steam turbine 100. In at least one embodiment, illustrated in FIG. 3A, the stationary member 202 may include an annular body 302 defining a plurality of openings 304 extending therethrough from an outer circumferential surface 306 to an inner circumferential surface 308 thereof. The plurality of openings 304 may have any suitable shape and/or size, and may be circumferentially spaced at substantially equal intervals or at varying intervals about the annular body 302 of the stationary member 202. In at least one embodiment, the stationary member 202 may be fabricated (e.g., cast or machined) as a monolithic or single structure. In another embodiment, the stationary member 202 may be fabricated from a plurality of components or segments coupled with one another.

Referring to FIGS. 2 and 3A, the stationary member 202 may include a flange 310 extending annularly about a first axial end portion 312 of the annular body 302 and configured to couple or mount the stationary member 202 within the casing 102 of the multi-stage steam turbine 100. For example, the flange 310 may extend radially outward from the first axial end portion 312 of the annular body 302 toward an inner surface 206 of the casing 102 to couple the stationary member 202 with the casing 102. In at least one embodiment, the inner surface 206 of the casing 102 may define a recess or groove 208 configured to receive at least a portion of the flange 310. The stationary member 202 may be coupled with the casing 102 such that a fluid tight seal may be provided or formed between the flange 310 and the inner surface 206 of the casing 102.

In at least one embodiment, the stationary member 202 may include a lip 314 extending from a second axial end portion 316 of the annular body 302. For example, as illustrated in FIG. 3A, the lip 314 may extend radially outward from the second axial end portion 316 of the annular body 302. As further described herein with reference to FIGS. 3C and 3D, the lip 314 may be configured to at least partially maintain an axial alignment of the rotatable member 204 relative to the stationary member 202. In at least one embodiment, the stationary member 202 may also include a protuberance 318 extending from the second axial end portion 316 of the annular body 302 and configured to reduce leakage of the steam from the upstream stage 110 to the downstream stage 112. For example, as illustrated in FIG. 3A with continued reference to FIG. 2, the protuberance 318 may extend radially inward from the second axial end portion 316 of the annular body 302 toward the rotary shaft 104 to thereby reduce leakage of the steam from the upstream stage 110 to the downstream stage 112.

In at least one embodiment, illustrated in FIG. 2, the stationary member 202 may include a sealing substrate 210 coupled with or otherwise forming at least a portion of the protuberance 318 and/or the stationary member 202. The sealing substrate 210 may be fabricated from an abradable material, such as an aluminum alloy, a copper alloy, a powder metal alloy, a graphite-containing ferrous alloy, a polymer, or the like, or any combination thereof. In at least one embodiment, the sealing substrate 210 may include a seal surface 212 configured to reduce the leakage of the steam from the upstream stage 110 to the downstream stage 112. As illustrated in FIG. 2, the seal surface 212 may define a plurality of teeth extending radially inward toward the rotary shaft 104 to provide a labyrinth seal. It may be appreciated that the seal surface 212 of the sealing substrate 210 may include or define any type of seal known in the art, including, but not limited to, a hole-pattern seal, an aerodynamic swirl break seal, or the like.

FIG. 3B illustrates a cross-sectional, perspective view of the rotatable member 204 of the grid valve assembly 200 of FIG. 2, according to one or more embodiments. In at least one embodiment, the rotatable member 204 may be or include an annular or hollow cylindrical body 320 configured to rotate about at least a portion of the stationary member 202. The rotatable member 204 may define a plurality of openings 322 extending therethrough from an outer circumferential surface 324 to an inner circumferential surface 326 thereof. The plurality of openings 322 may have any suitable shape and/or size, and may be circumferentially spaced at substantially equal intervals or at varying intervals about the outer circumferential surface 324 of the rotatable member 204. In at least one embodiment, the stationary member 202 may be fabricated (e.g., cast or machined) as a monolithic or single structure. In another embodiment, the stationary member 202 may be fabricated from a plurality of components or segments coupled with one another.

As previously discussed, the rotatable member 204 may be disposed adjacent the stationary member 202 and configured to rotate relative to the stationary member 202. In at least one embodiment, the rotatable member 204 may be concentric with and disposed radially inward of the stationary member 202 such that the outer circumferential surface 324 of the rotatable member 204 may be disposed adjacent to the inner circumferential surface 308 of the stationary member 202. In another embodiment, the rotatable member 204 may be disposed about at least a portion of the stationary member 202 and may be configured to rotate thereabout. For example, as illustrated in FIGS. 3C and 3D, the rotatable member 204 may be disposed about the outer circumferential surface 306 of the annular body 302 between the flange 310 and the lip 314. The rotatable member 204 may be configured to rotate about the annular body 302, and the flange 310 and the lip 314 may be configured to maintain the axial alignment of the rotatable member 204 relative to the stationary member 202.

Figure 3E:
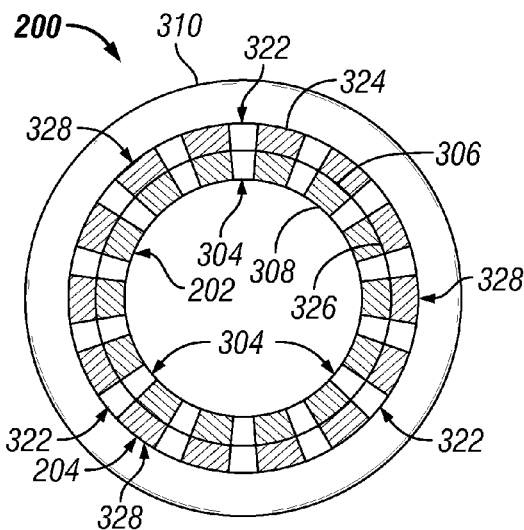
FIG. 3E illustrates a cross-sectional view of the grid valve assembly in an opened position taken along line 2E-2E in FIG. 3C, according to one or more embodiments disclosed.
Figure 3F:
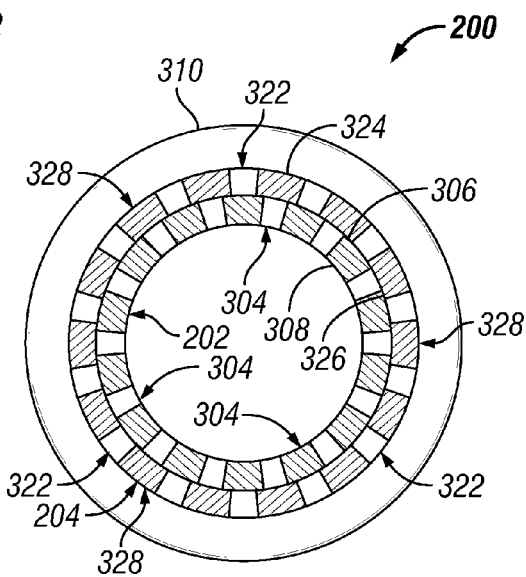
FIG. 3F illustrates a cross-sectional view of the grid valve assembly in a closed position, according to one or more embodiments disclosed.

In at least one embodiment, the circumferential spacing of the plurality of openings 322 of the rotatable member 204 may be at least partially determined by the circumferential spacing of the plurality of openings 304 of the stationary member 202. For example, as illustrated in FIGS. 3E and 3F, the circumferential spacing of the plurality of openings 322 may be substantially equal or similar to the circumferential spacing of the plurality of openings 304. Accordingly, the rotatable member 204 may be rotated relative to the stationary member 202 such that each opening 322 of the plurality of openings 322 may be radially aligned with a respective opening 304 of the plurality of openings 304.

In at least one embodiment, the number of the openings 322 defined in the rotatable member 204 may be the same as the number of the openings 304 defined in the stationary member 202. In another embodiment, the number of the openings 322 defined in the rotatable member 204 may be different than the number of the openings 304 defined in the stationary member 202. Additionally, the size and/or shape of the plurality of openings 322 of the rotatable member 204 may be determined, at least in part, by the size and shape of the plurality of openings 304 of the stationary member 202. For example, the size and/or shape of the plurality of openings 322 may be substantially similar to the size and/or shape of the plurality of openings 304. In another example, the size and/or shape of the plurality of openings 322 may be different than the size and/or shape of the plurality of openings 304.

In at least one embodiment, illustrated in FIG. 3E with continued reference to FIG. 2, the grid valve assembly 200 may be actuated to an "opened" position to thereby provide fluid communication between the upstream stage 110 and the downstream stage 112. For example, as illustrated in FIG. 3E, the rotatable member 204 may be rotated such that the plurality of openings 322 thereof at least partially overlap with the plurality of openings 304 of the stationary member 202 to thereby provide fluid communication between the upstream stage 110 and the downstream stage 112 via the grid valve assembly 200. Accordingly, in the "opened" position (see FIG. 3E), the grid valve assembly 200 may allow the steam to flow radially inward from the upstream stage 110 to the downstream stage 112 via the plurality of openings 304, 322 thereof.

In at least one embodiment, illustrated in FIG. 3F with continued reference to FIG. 2, the grid valve assembly 200 may be actuated to a "closed" position to thereby prevent fluid communication between the upstream stage 110 and the downstream stage 112. For example, as illustrated in FIG. 3F, the rotatable member 204 may be rotated relative to the stationary member 202 such that the plurality of openings 304 of the stationary member 202 may be completely covered by the rotatable member 204 to thereby prevent fluid communication between the upstream stage 110 and the downstream stage 112 via the grid valve assembly 200. As illustrated in FIG. 3F, in the "closed" position, portions 328 of the rotatable member 204 disposed between adjacent openings of the plurality of openings 322 may completely overlap or cover the plurality of openings 304 defined in the stationary member 202. Accordingly, in the "closed" position (see FIG. 3F), the grid valve assembly 200 may prevent the steam from flowing radially inward from the upstream stage 110 to the downstream stage 112.

Figure 4:
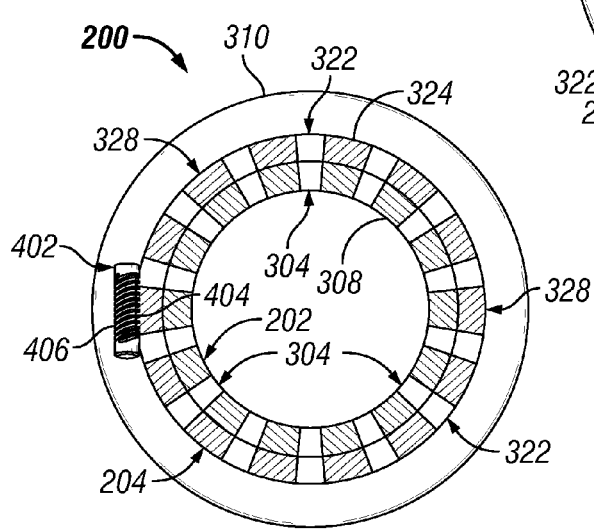
FIG. 4 illustrates a cross-sectional view of the grid valve assembly coupled with a gear of the multi-stage steam turbine of FIG. 1, according to one or more embodiments disclosed.

In at least one embodiment, the rotatable member 204 may be driven or rotated via one or more gears 402 of the multi-stage steam turbine 100. For example, as illustrated in FIG. 4, the rotatable member 204 may define a plurality of teeth 404 extending along at least a portion of the outer circumferential surface 324 thereof. The plurality of teeth 404 may be configured to engage with corresponding teeth 406 formed in the gears 402 of the multi-stage steam turbine 100. Accordingly, the gear 402 may be driven or rotated to correspondingly rotate the rotatable member 204 relative to the stationary member 202. Illustrative gears 402 may include, but are not limited to, worm gears, bevel gears, helical gears, pinion gears, or the like.

Figure 5:
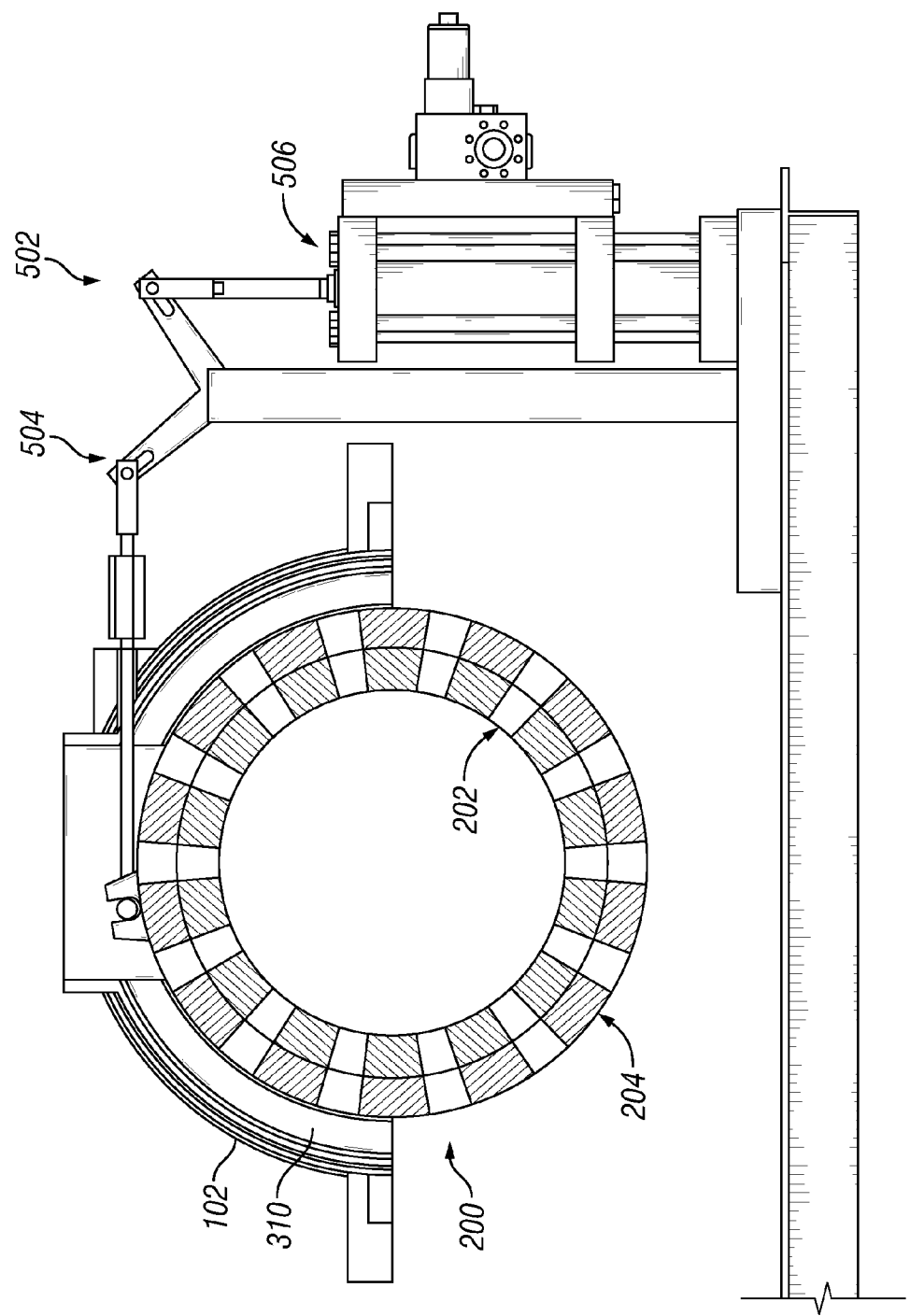
FIG. 5 illustrates a partial, cross-sectional view of the conventional multi-stage steam turbine of FIG. 1 including the grid valve assembly of FIG. 2 and an actuating assembly, according to one or more embodiments disclosed.

In another embodiment, illustrated in FIG. 5, the grid valve assembly 200 may be coupled with an actuating assembly 502 configured to rotate the rotatable member 204. The actuating assembly 502 may include a system of linkages 504 configured to be actuated by an actuator 506. As illustrated in FIG. 5, the actuator 506 may be or include a hydraulic cylinder. It may be appreciated, however, that the actuator 506 may be any suitable device capable of actuating the system of linkages 504 to thereby rotate the rotatable member 204. For example, illustrative actuators 506 may include, but are not limited to, one or more servos, motors, or the like, or any combination thereof.

As previously discussed, the upstream stage 110 of the multi-stage steam turbine 100 may be configured to contain the steam at a relatively higher pressure than the downstream stage 112, which may be configured to contain the steam at a relatively lower pressure. In at least one embodiment, illustrated in FIG. 3C with continued reference to FIG. 2, the pressure differential between the upstream and downstream stages 110, 112 may result in biasing forces being applied or exerted on the outer circumferential surface 324 of the rotatable member 204, as indicated by arrows 330, 332. For simplicity, FIG. 3C illustrates a first biasing force 330 being applied to a first portion (e.g., lower portion) of the rotatable member 204 and an opposing second biasing force 332 being applied to a second portion (e.g., upper portion) of the rotatable member 204. As illustrated in FIG. 3C, the biasing forces 330, 332 may be applied to the outer circumferential surface 324 of the rotatable member 204 in opposing radially inward directions.

In at least one embodiment, the magnitude of the biasing forces 330, 332 may be at least partially determined by or represented as a function of the pressure differential of the steam across the grid valve assembly 200 or between the upstream and downstream stages 110, 112 (see FIG. 2). For example, an increase or decrease in the pressure differential across the grid valve assembly 200 may correspondingly increase or decrease the magnitude of the biasing forces 330, 332 applied to the outer circumferential surface 324 of the rotatable member 204. The magnitude of the biasing forces 330, 332 may also be at least partially determined by or represented as a function of the surface area of the rotatable member 204 exposed to the steam in the upstream stage 110. Accordingly, the surface area of the outer circumferential surface 324 of the rotatable member 204 (e.g., the surface area of the portions 328 disposed between the plurality of openings 322) may be varied (i.e., increased or decreased) to control the magnitude of the opposing biasing forces 330, 332.

In at least one embodiment, the pressure differential and the resulting biasing forces 330, 332 may result in a net biasing force being applied to or exerted on the rotatable member 204. The net biasing force may be at least partially determined by the sum of the biasing forces 330, 332 acting on the rotatable member 204. In at least one embodiment, the net biasing force may at least partially determine the direction and/or the magnitude in which the rotatable member 204 may be displaced or urged relative to the stationary member 202. For example, increasing the first biasing force 330 relative to the second biasing force 332 may result in a net biasing force in the direction of the first biasing force 330 and the rotatable member 204 may be urged upward in the direction of the first biasing force 330.

In at least one embodiment, the grid valve assembly 200 may be configured to decrease the net biasing force applied to the rotatable member 204 to thereby minimize the displacement of the rotatable member 204 relative to the stationary member 202. For example, the grid valve assembly 200 may be configured such that the magnitude of the opposing biasing forces 330, 332 may be equal or substantially equal with one another to thereby minimize the net biasing force applied to the rotatable member 204. Accordingly, the grid valve assembly 200 may be configured such that the first biasing force 330 may be substantially offset by the opposing second biasing force 332 to thereby minimize the net biasing force and the displacement of the rotatable member 204 relative to the stationary member 202.

In at least one embodiment, the grid valve assembly 200 may be configured to decrease the net biasing force applied to the rotatable member 204 by varying the outer circumferential surface 324 of the rotatable member 204. For example, as previously discussed, the surface area of the outer circumferential surface 324 of the rotatable member 204 (e.g., the surface area of the portions 328 disposed between the plurality of openings 322) may be varied (i.e., increased or decreased) to control the magnitude of the biasing forces 330, 332. Accordingly, the rotatable member 204 may be configured such that the surface area acted on by the opposing biasing forces 330, 332 may be equal or substantially equal with one another to thereby equalize the magnitude of the opposing biasing forces 330, 332 and minimize the net biasing force.

Referring back to FIG. 2, in at least one embodiment, the multi-stage steam turbine 100 may include an annular nozzle plate 214 configured to control the flow of the steam downstream of the grid valve assembly 200. For example, the annular nozzle plate 214 may be disposed in the downstream stage 112 of the multi-stage steam turbine 100 near or adjacent the grid valve assembly 200 to control the flow of the steam downstream from the grid valve assembly 200. The annular nozzle plate 214 may define a plurality of nozzles 216 extending therethrough. The plurality of nozzles 216 may be grouped or compartmentalized such that a first portion or group (not shown) of the plurality of nozzles 216 may direct the steam flowing therethrough to a first downstream process, and a second portion (not shown) of the plurality of nozzles 216 may direct the steam flowing therethrough to a second downstream process. In at least one embodiment, the annular nozzle plate 214 may be configured to temporally control the flow of the steam to the first and second downstream processes. For example, the plurality of nozzles 216 may be configured such that the first downstream process receives the steam before, after, or concurrently with the second downstream process. In another embodiment, the annular nozzle plate 214 may be configured to control a mass flow of the steam directed to the first and second downstream processes. For example, the plurality of nozzles may be configured such that the mass flow of the steam directed to the first downstream process may be greater than, less than, or substantially equal to the mass flow of the steam directed to the second downstream process.

Figure 6:
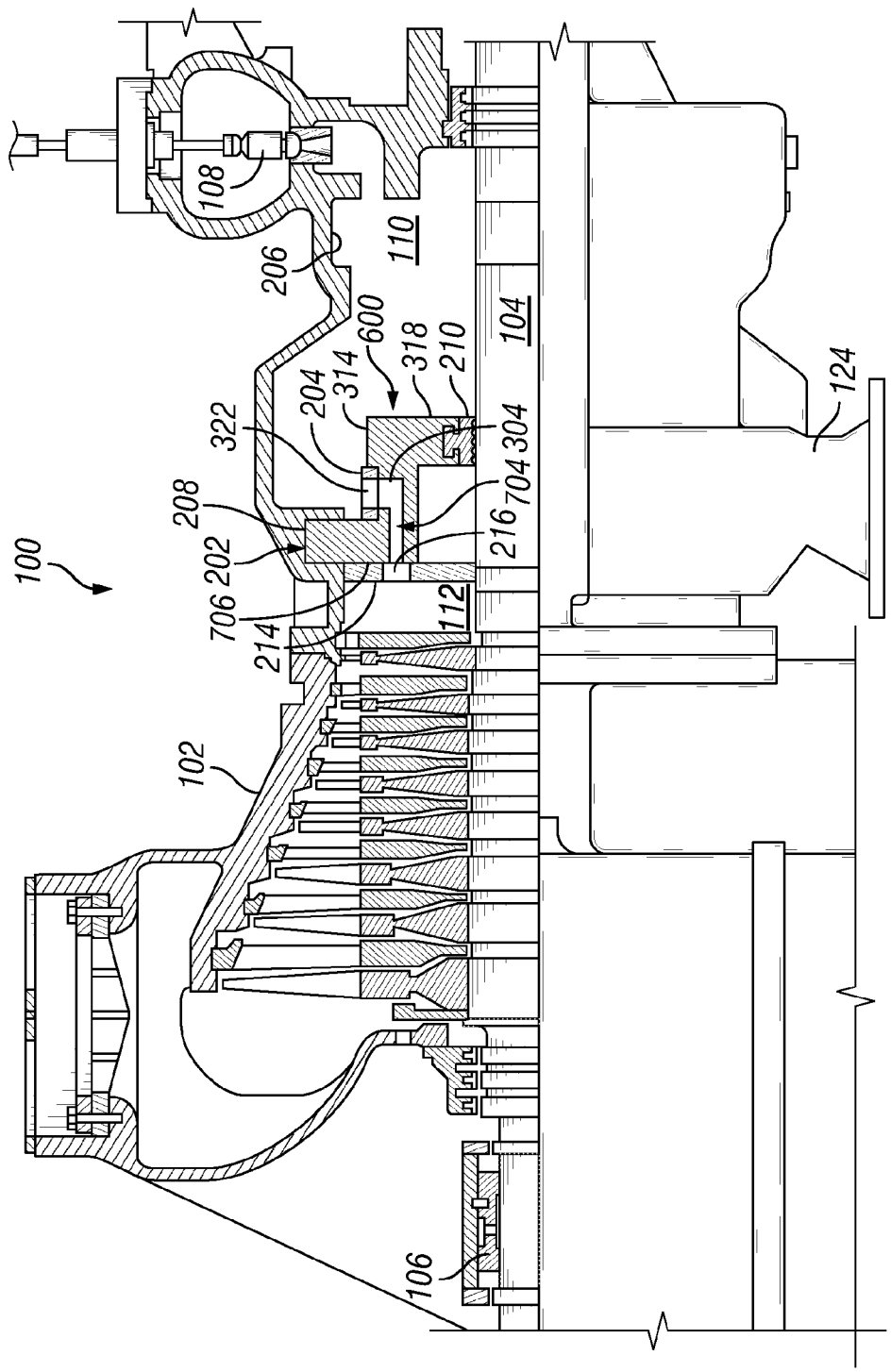
FIG. 6 illustrates a partial, cross-sectional view of the conventional multi-stage steam turbine of FIG. 1 including another exemplary grid valve assembly, according to one or more embodiments disclosed.
Figure 7:
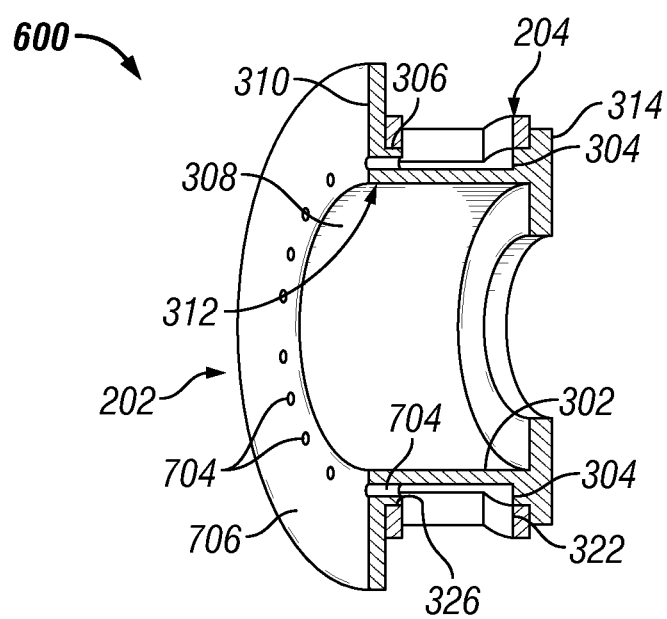
FIG. 7 illustrates a cross-sectional, perspective view of the grid valve assembly of FIG. 6, according to one or more embodiments disclosed.

FIG. 6 illustrates a cross-sectional view of another exemplary grid valve assembly 600 disposed in the multi-stage steam turbine 100 of FIG. 1, according to one or more embodiments. The grid valve assembly 600 may be substituted for or be utilized in place of the conventional grid valve assembly 114 in the multi-stage steam turbine 100 discussed above with reference to FIG. 1. FIG. 7 illustrates a cross-sectional, perspective view of the grid valve assembly 600 of FIG. 6, according to one or more embodiments. The grid valve assembly 600 may be similar in some respects to the grid valve assembly 200 described above and therefore may be best understood with reference to the description of FIGS. 3A-3F where like numerals designate like components and will not be described again in detail.

As illustrated in FIG. 7, the plurality of openings 304 may extend radially through only a portion of the annular body 302 from the outer circumferential surface 306 toward the inner circumferential surface 308. In at least one embodiment, the first axial end portion 312 of the annular body 302 may define a plurality of bores 704 fluidly coupled with the plurality of openings 304. As illustrated in FIG. 7, the plurality of bores 704 may extend axially through the first axial end portion 312 of the annular body 302 from an annular surface 706 to the plurality of openings 304. The plurality of bores 704 may be circumferentially spaced along the annular surface 706 of the stationary member 202 at substantially equal intervals or at varying intervals. In an exemplary operation, illustrated in FIG. 7 with continued reference to FIG. 6, the grid valve assembly 600 may be actuated to an "opened position" to provide fluid communication between the upstream stage 110 and the downstream stage 112 via the plurality of openings 304, 322 and the plurality of bores 704. For example, in the "opened" position (see FIG. 7), the grid valve assembly 600 may allow the steam to flow radially inward through the plurality of openings 304, 322 thereof, and may further allow the steam to flow axially through the plurality of bores 704 to thereby provide fluid communication between the upstream and downstream stages 110, 112.

In at least one embodiment, the plurality of bores 704 may be configured to provide one or more functions of the annular nozzle plate 214 discussed above with reference to FIG. 2. For example, the plurality of bores 704 may be configured to control the flow of the steam downstream of the grid valve assembly 600. The plurality of bores 704 may also be grouped or compartmentalized such that a first portion or group of the plurality of bores 704 may direct the steam flowing therethrough to the first downstream process, and a second portion of the plurality of bores 704 may direct the steam flowing therethrough to the second downstream process. The plurality of bores 704 may further be configured to temporally control the flow of the steam to the first and second downstream processes. The plurality of bores 704 may also be configured to control the mass flow of the steam directed to the first and second downstream processes. Accordingly, in at least one embodiment, the grid valve assembly 600 may be utilized in the multi-stage steam turbine 100 without the annular nozzle plate 214. In another embodiment, the grid valve assembly 600 may be utilized in conjunction with the annular nozzle plate 214. For example, as illustrated in FIG. 6, the plurality of bores 704 may be configured to direct the steam to the plurality of nozzles 216 of the annular nozzle plate 214.

Figure 8:
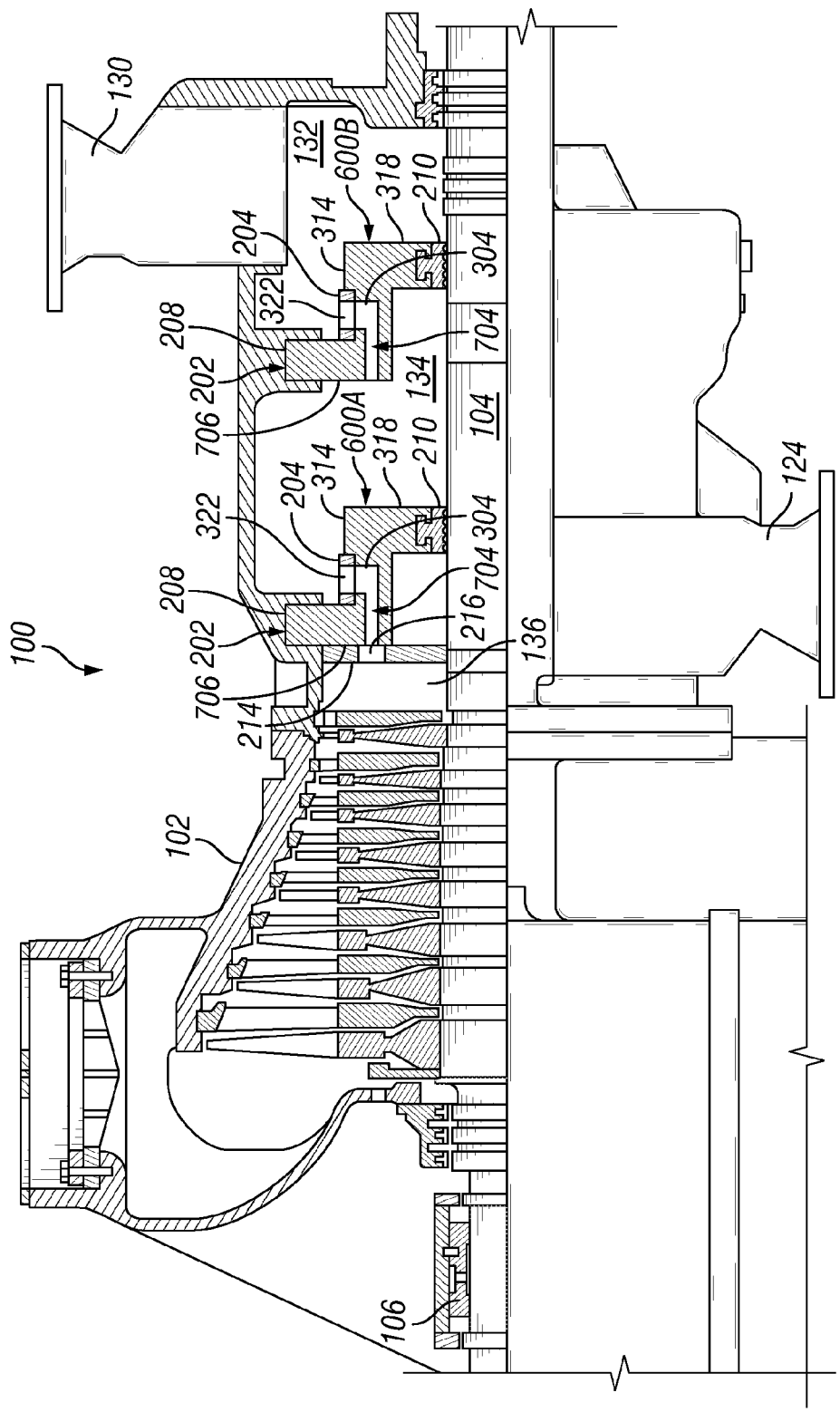
FIG. 8 illustrates a partial, cross-sectional view of the conventional multi-stage steam turbine of FIG. 1 including two grid valve assemblies of FIG. 6, according to one or more embodiments disclosed.

FIG. 8 illustrates a partial, cross-sectional view of the multi-stage steam turbine 100 including two exemplary grid valve assemblies 600A, 6006, according to one or more embodiments disclosed. The grid valve assemblies 600A, 600B may be similar to the grid valve assembly 600 (FIGS. 6 and 7) described above and therefore may be best understood with reference to the description of FIGS. 6 and 7 where like numerals designate like components and will not be described again in detail. As illustrated in FIG. 8, the inlet control valve 108 (FIG. 6) may be absent and the grid valve assembly 600B may be configured to be utilized at least in part as the inlet control valve of the multi-stage steam turbine 100 to control steam entering the multi-stage steam turbine 100 via an inlet conduit 130. Accordingly, the grid valve assembly 600B may be disposed near or adjacent the inlet conduit 130.

The grid valve assemblies 600A, 600B may be axially separated from each other and may define three successive stages 132, 134, and 136 of the multi-stage steam turbine 100. The steam entering the multi-stage steam turbine 100 via the inlet conduit 130 may initially enter in the first stage 132. The grid valve assembly 600B may selectively provide fluid communication between the first stage 132 and the second stage 134, and the grid valve assembly 600A may selectively provide fluid communication between the second stage 134 and the third stage 136. The steam in the first stage 132 may be at a relatively higher pressure than the steam in the second stage 134 that is downstream from the first stage 132, and the steam in the second stage 134 may be at a relatively higher pressure than the steam in the third stage 136 that is downstream from the second stage 134.

In an exemplary embodiment, the grid valve assemblies 600A, 6006 may be similar to the grid valve assembly 200 (FIG. 2) described above. In another exemplary embodiment, one of the grid valve assemblies 600A, 600B may be similar to the grid valve assembly 600, while the other grid valve assembly may be similar to the grid valve assembly 200. It should be noted that, although FIG. 8 illustrates only two grid valve assemblies 600A, 600б, exemplary embodiments are not limited thereto and the multi-stage steam turbine 100 may include three or more grid valve assemblies that define four or more successive stages of the multi-stage steam turbine 100.

It should also be noted that, although FIG. 8 does not illustrate an annular nozzle plate near or adjacent the grid valve assembly 600B, exemplary embodiments are not limited thereto and an annular nozzle plate may be disposed in the second stage 134 near or adjacent the grid valve assembly 600B to control the flow of the steam downstream from the grid valve assembly 600B. For instance, the annular nozzle plate may be similar to the annular nozzle plate 214 in FIG. 6.

Figure 9:
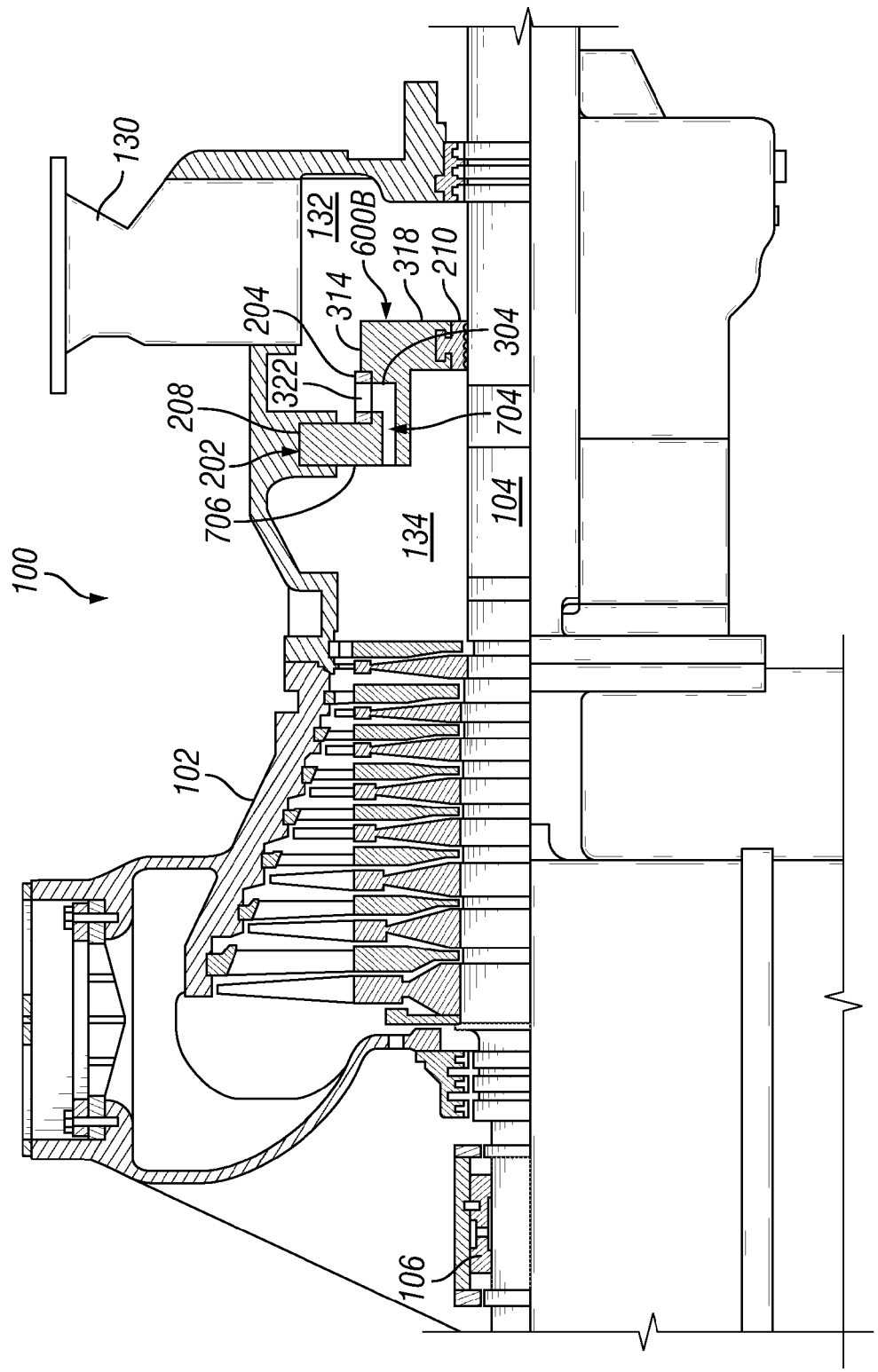
FIG. 9 illustrates a partial, cross-sectional view of the multi-stage steam turbine of FIG. 1 including the grid valve assembly of FIG. 8 configured to be utilized at least in part as the main inlet valve, according to one or more embodiments disclosed.

FIG. 9 illustrates a partial, cross-sectional view of the multi-stage steam turbine 100 including the grid valve assembly 600B that may be configured to be utilized at least in part as the main inlet valve of the multi-stage steam turbine 100, according to one or more embodiments disclosed. As illustrated, the multi-stage steam turbine 100 may not include the one or more grid valve assemblies 600A of FIG. 8. Also, the extraction conduit 124 of FIG. 8 may be absent.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A grid valve assembly for a steam turbine, comprising:
an annular stationary member disposed between an upstream stage and a downstream stage of the steam turbine, the annular stationary member defining a plurality of stationary member openings extending radially therethrough from an outer circumferential surface to an inner circumferential surface thereof, a first axial end portion of the annular stationary member defining a plurality of axial bores fluidly coupled with the plurality of stationary member openings; and
an annular rotatable member rotatably disposed about the outer circumferential surface of the annular stationary member and defining a plurality of rotatable member openings extending radially therethrough.

2. The grid valve assembly of claim 1, wherein the annular stationary member includes a flange extending radially outward from the first axial end portion thereof and configured to couple the annular stationary member with a casing of the steam turbine.

3. The grid valve assembly of claim 2, wherein the annular stationary member includes a lip extending radially outward from a second axial end portion thereof.

4. The grid valve assembly of claim 3, wherein the annular rotatable member is rotatably disposed about the outer circumferential surface of the annular stationary member between the flange and the lip, and the flange and the lip are configured to maintain an axial alignment of the annular rotatable member relative to the annular stationary member.

5. The grid valve assembly of claim 1, wherein the annular rotatable member is configured to rotate about the annular stationary member such that the rotatable member openings at least partially overlap with the stationary member openings to thereby actuate the grid valve assembly to an opened position.

6. The grid valve assembly of claim 1, wherein the annular rotatable member is configured to rotate about the annular stationary member such that portions of the annular rotatable member disposed between the rotatable member openings cover the stationary member openings to thereby actuate the grid valve assembly to a closed position.

7. The grid valve assembly of claim 1, wherein the annular rotatable member defines a plurality of teeth along at least a portion of an outer circumferential surface thereof, the plurality of teeth configured to engage with and be driven by a gear.

8. The grid valve assembly of claim 1, wherein the annular rotatable member is coupled with an actuating assembly via a system of linkages, the actuating assembly configured to rotate the annular rotatable member relative to the annular stationary member.

9. A steam turbine, comprising:
a casing at least partially defining a first stage and a second stage of the steam turbine, the second stage being downstream from the first stage;
a rotary shaft supported in the casing;
a first grid valve assembly configured to control a flow of steam from the first stage to the second stage, the first grid valve assembly comprising:
a first stationary member disposed about the rotary shaft and coupled with the casing between the first stage and the second stage, the first stationary member defining a plurality of first stationary member openings extending radially through at least a portion of the first stationary member; and
a first rotatable member disposed about the first stationary member and defining a plurality of first rotatable member openings extending radially therethrough, the first rotatable member configured to rotate about the first stationary member to selectively provide fluid communication between the first stage and the second stage,
wherein an axial end portion of the first stationary member defines an annular surface and a plurality of axial bores extend from the annular surface to the plurality of first stationary member openings, the plurality of axial bores being fluidly coupled with the plurality of first stationary member openings.

10. The steam turbine of claim 9, further comprising:
an inlet control valve configured to control steam entering the first stage of the steam turbine.

11. The steam turbine of claim 9, further comprising:
an inlet conduit in fluid communication with the first stage, the first grid valve assembly disposed at or adjacent the inlet conduit.

12. The steam turbine of claim 11, further comprising:
a second grid valve assembly disposed between the second stage and a third stage downstream from the second stage, the second grid valve assembly comprising:
a second stationary member disposed about the rotary shaft and coupled with the casing, the second stationary member defining a plurality of second stationary member openings extending radially through at least a portion of the second stationary member; and
a second rotatable member disposed about the second stationary member and defining a plurality of second rotatable member openings extending radially therethrough, the second rotatable member configured to rotate about the second stationary member to selectively provide fluid communication between the second stage and the third stage.

13. The steam turbine of claim 9, further comprising a nozzle plate disposed in the second stage adjacent the first stationary member of the first grid valve assembly, the nozzle plate defining a plurality of nozzles configured to control the flow of the steam downstream from the first grid valve assembly.

14. The steam turbine of claim 9, wherein the first rotatable member is configured to rotate about the first stationary member such that the first rotatable member openings at least partially overlap with the first stationary member openings to thereby allow the steam to flow from the first stage to the second stage.

15. The steam turbine of claim 9, wherein the first rotatable member is configured to rotate about the first stationary member such that portions of the first rotatable member between the first rotatable member openings cover the first stationary member openings to thereby prevent fluid communication between the first stage and the second stage.

16. The steam turbine of claim 9, wherein:
the first stationary member has an annular body and the first stationary member openings extend radially through at least a portion of the annular body from an outer circumferential surface toward an inner circumferential surface thereof.

17. A grid valve assembly for a steam turbine, comprising:
a stationary member having an annular body disposed between an upstream stage and a downstream stage of the steam turbine, the stationary member defining stationary member openings extending radially through a portion of the annular body from an outer circumferential surface toward an inner circumferential surface thereof, a first axial end portion of the stationary member defining a plurality of axial bores fluidly coupled with the stationary member openings; and
an annular rotatable member disposed about the outer circumferential surface of the annular body and defining rotatable member openings extending radially therethrough, the annular rotatable member configured to rotate about the annular body of the stationary member to selectively provide fluid communication between the upstream stage and the downstream stage of the steam turbine.

18. The grid valve assembly of claim 17, wherein the plurality of axial bores extend from an annular surface of the stationary member to the stationary member openings.

19. The grid valve assembly of claim 17, wherein the stationary member further comprises:
a flange extending radially outward from the first axial end portion of the annular body and configured to couple the stationary member with a casing of the steam turbine; and
a lip extending radially outward from a second axial end portion of the annular body and configured to at least partially maintain an axial alignment of the annular rotatable member relative to the stationary member.

20. The grid valve assembly of claim 17, wherein the stationary member further comprises a sealing substrate coupled with the annular body and configured to reduce leakage of steam from the upstream stage to the downstream stage of the steam turbine.

\* \* \* \* \*